United States Patent [19]

Telle

[11] Patent Number: 5,298,937
[45] Date of Patent: Mar. 29, 1994

[54] HIGH PRODUCTIVITY METHOD AND APPARATUS FOR SCANNING SIMPLEX OR DUPLEX ORIGINALS

[75] Inventor: Lawrence B. Telle, Rochester, N.Y.

[73] Assignee: Eastman Kodak Company, Rochester, N.Y.

[21] Appl. No.: 341

[22] Filed: Jan. 4, 1993

[51] Int. Cl.⁵ ..................... G03B 27/32; G03G 21/00
[52] U.S. Cl. .................... 355/23; 355/308; 355/233; 358/474; 358/498
[58] Field of Search .............. 355/233, 308, 313, 319, 355/23, 24; 358/474, 486, 496, 498

[56] References Cited

U.S. PATENT DOCUMENTS

| | | | |
|---|---|---|---|
| 3,844,653 | 10/1974 | Kelly | 355/233 |
| 3,936,171 | 2/1976 | Brooke | 355/271 |
| 3,980,406 | 9/1976 | Lang | 355/242 X |
| 3,998,543 | 12/1976 | Wick et al. | 355/232 X |
| 4,218,128 | 8/1980 | Satomi et al. | 355/313 |
| 4,536,077 | 8/1985 | Stoffel | 355/235 |
| 4,571,636 | 2/1986 | Itoh | 358/285 |
| 4,657,376 | 4/1987 | Ide | 355/309 |
| 4,734,742 | 3/1988 | Klumpp et al. | 355/23 |
| 4,743,974 | 5/1988 | Lockwood | 358/285 |
| 4,908,719 | 3/1990 | Nonoyama | 358/494 |
| 4,949,189 | 8/1990 | Ohmori | 358/474 |

Primary Examiner—Fred L. Braun
Attorney, Agent, or Firm—J. Gary Mohr

[57] ABSTRACT

A scanning system that uses two cameras or scanners and two original document paths. If the system is to be used in a duplex mode, the original document is transmitted over a single document path while a first camera scans one side of the document and a second camera scans the other side of the document. If the system is to be used in a simplex mode, the original document is placed on either of the paths or, if a series of original documents are to be simplex scanned, both paths may be utilized at the same time. In this manner and with the use of mirrors, either camera may scan one side of the original document, one side of two original documents may be scanned at substantially the same time or two sides of the original document may be scanned at substantially the same time.

16 Claims, 5 Drawing Sheets

HIGH PRODUCTIVITY METHOD AND APPARATUS FOR SCANNING SIMPLEX OR DUPLEX ORIGINALS

BACKGROUND OF THE INVENTION

1. Field of the Invention

This invention relates, in general, to photocopying apparatus and, more specifically, to scanning, with one or more cameras or scanners, simplex or duplex original documents traveling along one or more document paths.

2. Description of the Prior Art

An apparatus for optically scanning information, such as characters and graphics, illustrated on both sides of, for example, a sheet-shaped original is disclosed in U.S. Pat. No. 4,657,376. The apparatus includes a copying machine provided with an auto document feeder. With such a copying machine, an original is first set on an original table by the auto document feeder, then images on one side of the original are exposed and scanned by an optical unit. The original, after one side is scanned, is moved off the table by the document feeder and turned over, by a flipping unit mounted on the feeder, before the original is again set on the table for scanning image information on the other side of the original by the optical unit.

A problem with scanning original documents having images on both sides, hereinafter referred to as duplex scanning, with the above apparatus, is that such scanning is time consuming. It is time consuming because it requires one side of the original to be scanned and then flipped over before the other side can be scanned.

Further, the flipping unit used in the above apparatus is a complicated structure and jamming, of the original, in the flipping unit may occur as the original is flipped over.

Another apparatus used for duplex scanning of originals is disclosed in U.S. Pat. No. 4,908,719 where an original document is placed upon a conveyance path, constituting an auto document feeder and one side of the original, moving on the conveyance path, is scanned by a first optical unit located above the conveyance path and the other side of the moving original is scanned by a second optical unit disposed near the first optical unit, but located below the conveyance path.

The problem with this type of apparatus is that there is only one original document path and, therefore, during a simplex scanning operation only one optical system may be utilized during said operation, thereby rendering the other optical system redundant and of no assistance in completing the simplex scanning operation.

It is therefore a primary object of this invention to provide a reliable scanning apparatus that can scan images on both sides of an original in a single pass and in an expedient manner as well as scan images on only one side of an original at up to twice the through put rate of duplex scanning.

SUMMARY OF THE INVENTION

There is disclosed herein a new and useful scanning system for high through put of both simplex and duplex originals.

According to a specific embodiment of the invention, a scanning apparatus for simplex and duplex document scanning is provided, said apparatus comprising:

a first and a second document path for transporting the documents to be scanned, a first scanning station positioned adjacent both document paths for scanning a first surface of documents transported along one of said document paths and a second surface of the documents transported along another document path, a second scanning station positioned adjacent only one of said document paths for scanning the surface, adjacent to said second scanning station, of documents traveling along said document path, and means for selectively directing the documents to the first and second document paths for scanning. An advantage of the above system is a higher productivity in through put scanning for both duplex and simplex originals.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

The apparatus of the preferred embodiment will be described in accordance with an electrophotographic reproduction apparatus and because such apparatus are well known, the present description will be directed in particular to elements forming part of, or cooperating more directly with, the present invention. Apparatus not specifically shown or described herein are selectable from those known in the art.

While the present invention is susceptible to embodiments of many different forms, there is shown in the drawings and hereinafter described, in detail, a preferred embodiment of the invention. It should be understood, however, that the present disclosure is to be considered an exemplification of the principles of the invention and is not intended to limit the invention to the embodiments illustrated and/or described.

For ease of description, all apparatus will be described in their normal operational position, and terms such as upper, lower, horizontal, etc., will be used with reference to normal operating positions. All apparatus, however, may be manufactured, stored, transported and sold in an orientation other than the normal operational positions described.

All references cited in this specification and their references are incorporated by reference herein where appropriate, for appropriate teaching of additional or alternative details, features and/or technical background.

Throughout the following description, similar reference characters refer to similar elements or members in all of the figures of the drawings.

Figure 1:
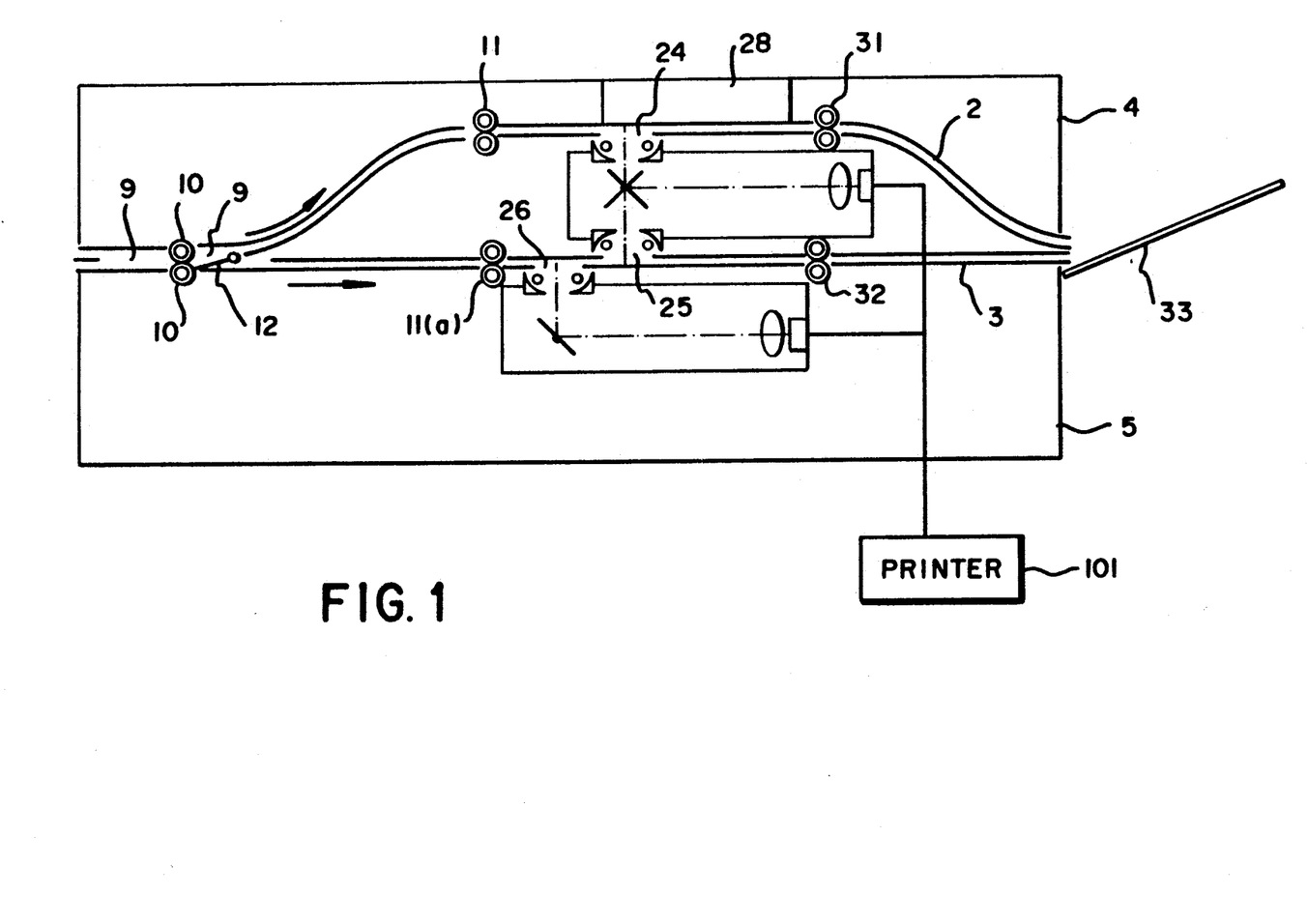
FIG. 1 is a side view of the scanning system according to the present invention.

Referring now to the drawings, and especially to FIG. 1, where the drawings are for the purpose of illustrating a preferred embodiment of the invention, and not for limiting same. FIG. 1 shows an input scanner system 1, in accordance with the invention, for an electrophotographic reproduction apparatus that generates a representation of an image on a document for transfer to a receiver, such as a sheet of paper. As used hereinafter, "document" refers to an image bearing original from which copying is desired. Documents may comprise image supporting substrates, such as cut sheets of paper, transparencies, unburst computer forms forming a continuous length of material, or any image bearing substrate from which copying is desired. When necessary, the type of document for which the description finds use will be described with greater particularity. "Image" as used herein refers to the information on the document, for which scanning is desired, and which will be in some manner transferred to the receiver or to an electronic storage medium. "Scanning" as used hereinafter, refers to the relative movement of photosensitive sensors with respect to documents for the purpose of acquiring a representation of the image or information about the image. However, it should be understood that the present invention could be adapted to be used with single optical exposure cameras, as is known in the art, but not shown, instead of the disclosed scanners.

Scanner system 1 is comprised of upper and lower document paths 2 and 3. Upper and lower document paths 2 and 3 are enclosed generally in upper and lower rectangular box-shaped members 4 and 5, connected by a hinge member (not shown) mounted to box shaped members 4 and 5. Either upper box shaped member 4 or lower box shaped member 5 has associated with it a document input tray 6 (see FIG. 2) for holding a stack of original documents 7, such as cut sheets of paper, from which data acquisition is desired. Document input tray 6 is provided with a document feeder 8 for feeding documents 7 from document input tray 6. In a preferred embodiment of the invention, document feeder 8 may be a well-known top feeding vacuum feeder found in standard document feeders for light-lens type copiers and used in conjunction with a turn over path 35 (see FIG. 2) before documents 7 are deposited in output tray 33 so that documents 7 may be maintained in proper sequential order. Document input tray 6 may also be upwardly biased or provided with a tray elevator (not shown) to convey documents 7 to a feeding position. It should be understood that a bottom feed document feeder, not shown, but known in the art, could be used in place of top feeder 8 and thereby turn over path 35 could be eliminated as shown in FIG. 1.

Figure 2:
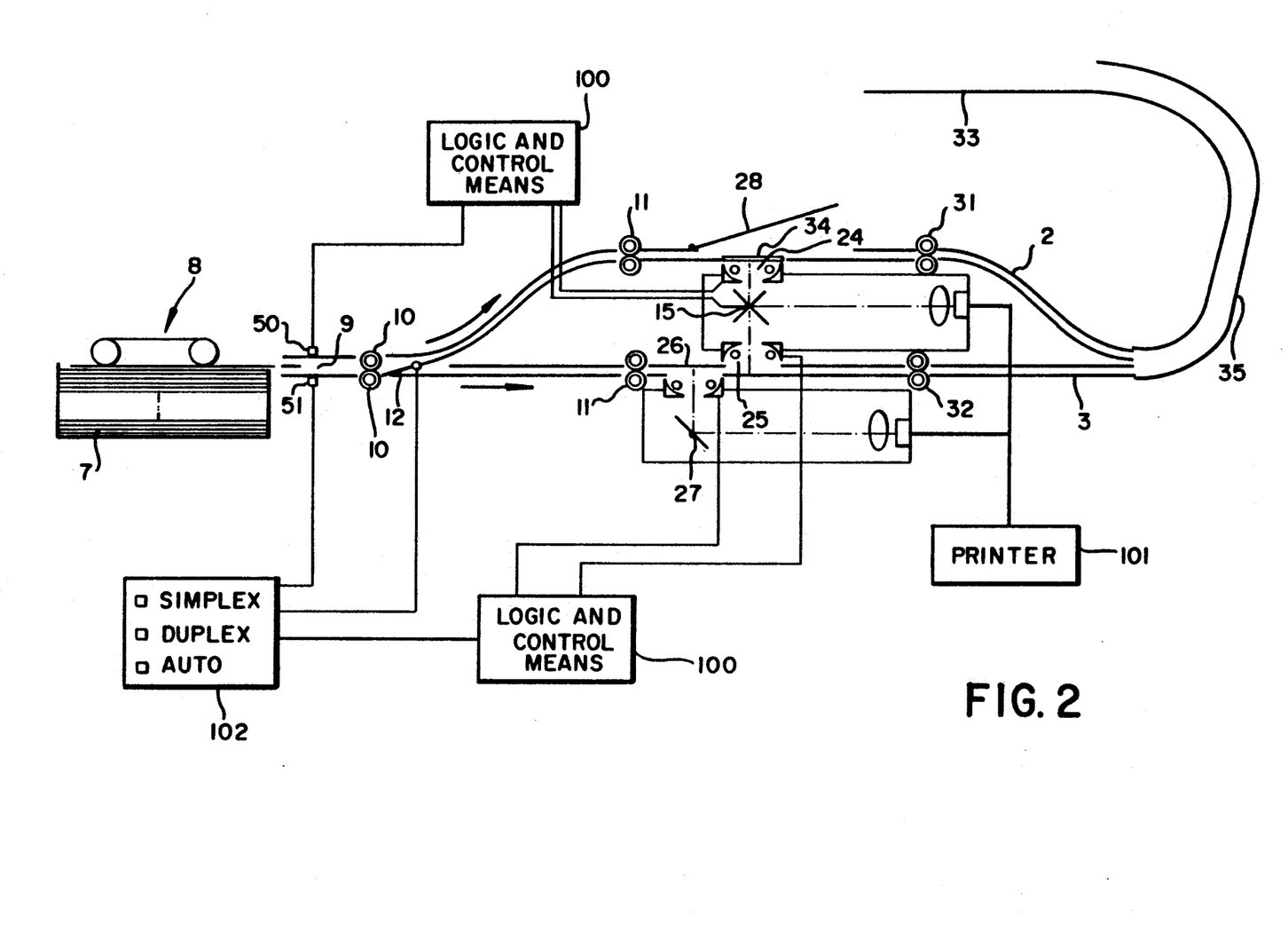
FIG. 2 is a side view of the scanning system according to the present invention, with the platen cover open.

As shown in FIG. 2, documents 7, from document tray 6, are directed by document feeder 8 to an input sheet path 9 for conveyance to one or more of three scanning positions 24, 25 or 26. After documents 7 are fed by feeder 8, to the entrance of sheet path 9, they are then driven by a pair of nip rubber rollers 1 0 to a point in sheet path 9 where documents 7 are directed to the entrance of either document path 2 or 3. A second set of nip rollers 1 1, located in document path 2, and a third set of nip rollers 11 (a), located in document path 3, comprise a cross roll de-skewing nip, known in the art, to correctly position documents 7 in a desired registered orientation before documents 7 approach the scanning station or stations associated with the document path along which documents 7 are traveling for either simplex or duplex scanning. A fourth 31 and a fifth 32 set of rollers direct documents 7 from the scanning station or stations to an exit tray 33. In a preferred embodiment of the invention, output tray may be a simple low energy uphill stacking tray without requirement for mechanical document handling therein. While an arrangement providing a document handler recirculating the documents back to an input tray is certainly possible, there is no need for the expensive and complicated mechanical document handling of those type of devices, since there is no need, in the present invention, to repeatedly present the document for reading or scanning as in most light lens copiers. This is because the image information contained on both sides of the document may be obtained during one pass through document path 3, and that image information may either be transferred to the receiver or stored for later or subsequent processing, as desired, in an electronic storage medium. A drive motor (not shown) is provided for driving document feeder 8, drive rollers 10, 11, 11(a), 31 and 32 as well as the other driving elements of input scanner 1.

Figure 3:
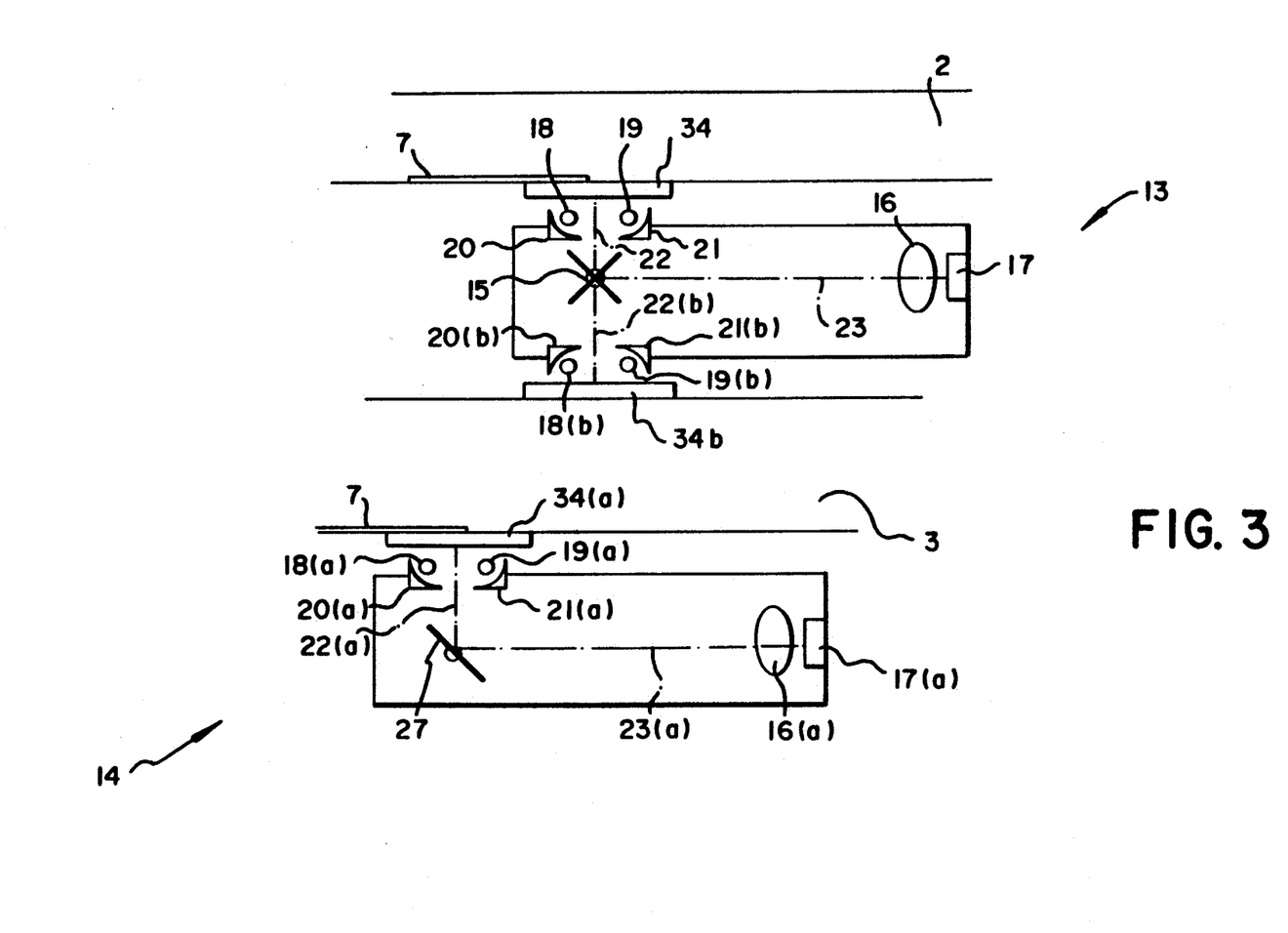
FIG. 3 is an exploded side view of the scanners in accordance with the present invention.

In a first simplex mode of operation, as documents 7 are driven into input sheet path 9, a movable diverter 12, located in input sheet path 9 and controlled by a logic and control means 100, to be later explained, blocks document path 3, so that documents 7 are diverted into path 2 for scanning by scanning station 13. Scanning station 13 is comprised, as shown in FIG. 3, of a scanning platen 34, a reflecting system 15, such as a movable mirror or a reflective mirror and transparent/reflective mirror combination, a lens 16 and an electro-optical image sensor 17, such as a line array composed of charge-coupled devices (CCD) or photodiodes. The operation of such scanning station 13 being such that as documents are moved across a platen 34, documents 7 are exposed to light or illumination from lamps 18 and 19 working in cooperation with reflectors 20 and 21, which light is then reflected from the surface of documents 7 facing said lights, along an optical path 22 until it impacts on mirror 15. Upon impact with mirror 15 the light is directed along an optical path 23 through lens 16 and onto sensor 17. In this manner as document 7 is fed along path 2 by rollers 1 1 past scanning position 24, images on the bottom side of document 7, as they pass over scanning position 24, reflect the light of lamps 18 and 19 along optical path 22 onto mirror 15. Mirror 15 then directs said light along optical path 23 and through lens 16 for focused impact on sensor 17. Sensor 17 then converts this focused light into an electronic representation of the image on document 7 for transmission to an image processing or storage device for ultimate transfer of the image to the receiver. The light conversion being the result of sensor 17 developing a charge indicative of the amount of light detected, which can then be transmitted to an image processor, such as a printer, a facsimile apparatus, a computer terminal or the like, for use in assimilating the electronically received representation of the image on document 7 that is to be transferred to the receiver or fed into storage memories for later use, all of which is known in the art.

In a duplex mode of operation, as documents 7 are driven into input sheet path 9, diverter 12 blocks path 2 so that documents 7 are directed into path 3 for scanning by both scanning stations 13 and 14. Scanning station 14, like scanning station 13, is comprised of a platen 34(a), a lens 16(a) and an electro-optical image sensor 17(a), however, mirror 27, of scanning station 14, unlike mirror 15, of scanning station 13, is not movable, but fixed. The operation of scanning station 14 is similar to scanning station 13 in that light from lamps 18(a) and 19(a), in cooperation with reflectors 20(a) and 21 (a), is reflected from the surface of original document 7, facing said lights, as document 7 travels across platen 34(a). The reflected light then travels along an optical path 22(a) until it impacts on mirror 27. Upon impact with mirror 27, the light is directed along an optical path 23(a) through lens 16(a) and onto electrooptical sensor 17(a). Therefore as document 7 is fed along path 3 by rollers 11(a) past scanning position 26, images on the bottom side of document 7, as they travel across scanning position 26, reflect the light of lamps 18(a) and 19(a) along optical path 22(a) onto mirror 27. Mirror 27 then directs said reflected light along optical path 23(a) for focused impact on sensor 17(a). Sensor 17(a) converts the focused light into an electronic representation of the image on document 7 for transmission to an image processing or storage device for ultimate transfer of the image to the receiver as is known in the art. Since mirror 15, of scanning station 13, is movable, mirror 15 during this duplex mode is moved such that it is positioned to direct the light, from lamps 18(b) and 19(b), in cooperation with reflectors 20(b) and 21(b), that is reflected from the image information residing on the top surface of documents 7, as documents 7 travel past platen 34(b) of scanning position 25. This reflected light is received by mirror 15 from optical path 22(b) with mirror 15 directing said reflected light toward lens 16 and electro-optical image sensor 17, through optical path 23 which is the same optical path as used in the above discussed simplex operation. In this manner, the output from electrooptical sensors 17 and 17(a) may be combined, as known in the art, to accomplish duplex scanning of document 7 with only one pass of document 7 along path 3.

In a second simplex mode of operation, as documents 7 are driven, image surface facing down, into input sheet path 9, diverter 12 oscillates to alternate the feeding of documents 7 between path 2 and path 3, with it being understood that other than an alternate feeding sequence of documents 7 between paths 2 and 3 may be used. In this manner the simplex through put scanning of documents 7, with two document paths being used, may be increased to double that of simplex scanning of documents with only one path being used, without any increase in the speed of the scanning system. In the alternative, if one desired, with the use of a two document path, the speed of the scanning system could be slowed down while still maintaining a simplex through put equivalent to a single document path scanning system. In the slow down mode there is a considerable amount of energy savings due to the fact that the intensity of the lights may be reduced due to longer document 7 exposure time when documents 7 move at a reduced rate of travel. It being further understood that in this simplex mode of operation mirror 15 had been moved into a position to receive and direct light reflected from the bottom surface of documents 7 as documents 7 travel along path 2.

In another sequencing of documents 7, between document paths 2 and 3, information detectors 50 and 51 (see FIG. 2) located at the beginning of input sheet path 9 detect the presence or absence of information on each side of documents 7 as documents 7 pass adjacent to information detectors 50 and 51. Depending upon information detected, diverter 12 is positioned so that documents 7 are directed to either path 2, path 3 or both and mirror 15 is positioned for the appropriate simplex or duplex scanning of said documents. The movement and positioning of mirror 15 and diverter 12 as well as the activation and deactivation of lights 18, 18(a), 18(b), 19, 19(a) and 19(b) is accomplished, at the appropriate time, by logic and control means 100, to be later explained. By the use of information detectors 50 and 51, mixing of documents 7 for both simplex and duplex scanning in input tray 6 is of no concern, since the information received from detectors 50 and 51 will determine if a particular document 7 is to be scanned in a simplex or duplex mode and the appropriate positioning of diverter 12 and mirror 15 will be performed without operator intervention. If, however, the operator desires a particular sequence mode of operation, information detectors 50 and 51 may either be turned off or their function overridden to assure the desired mode of sequence operation, such as by use of an override switch 102. As an alternative to using two sensors, one sensor may be used if the operator of scanner 1 loads all documents 7, in tray 6, such that the blank side of all simplex documents 7 will be adjacent to that sensor as documents 7 travel along path 9. In this manner, if that sensor detects any information on documents 7 passing adjacent to it, such document 7 will be treated as a duplex document.

Another feature of this invention, is if either path 2 or path 3 becomes non-functional, the copying apparatus may still be used to produce simplex copies by positioning diverter 12 to block the non-functional path.

Figures 4, 4A:
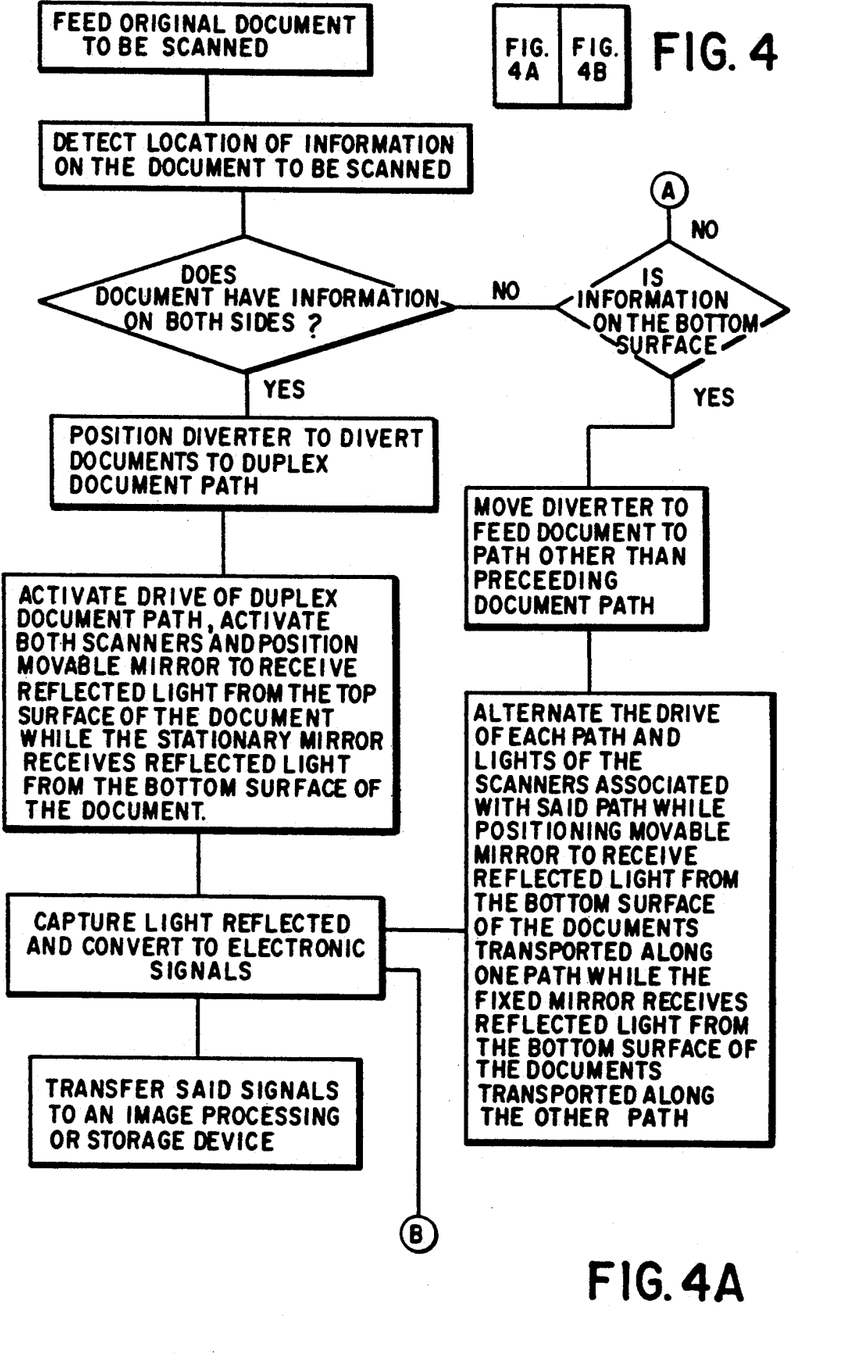
FIG. 4 a combination of FIG. 4A and 4B which together is a flow chart of a specific processing algorithm in accordance with the present invention.
Figure 4B:
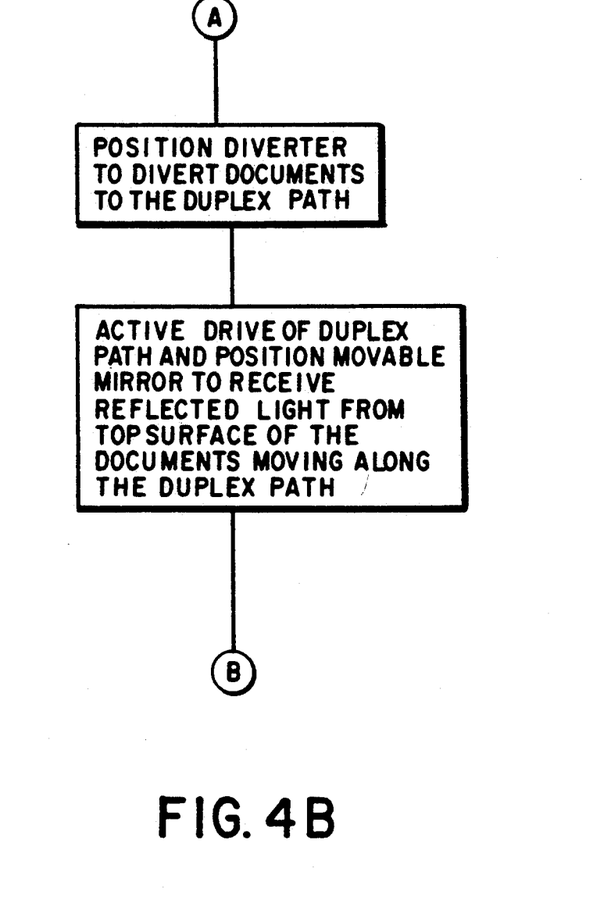

The heretofore mentioned logic and control means 100 (see FIGS. 2 and 4) are in communication with sensors 50 and 51 such that as sensor 50 and 51 detect images contained on either side of documents 7 passing adjacent to said sensors, that information is communicated to logic and control means 1 00. If the information communicated by sensor 50 and 51 disclose images contained on both sides of document 7, logic and control means 100, also in communication with diverter 12, mirror 15 and the lights of scanners 13 and 14, activates a motor, not shown, but known in the art, to move diverter 12 such that it blocks path 2 and thereby causes documents 7 to travel along path 3. Logic and control means 100 also activates, at substantially the same time, the same motor as used for moving diverter 12, or a different motor, to move mirror 15 such that it is positioned to receive the light of lights 18(b) and 19(b) (see FIG. 3) reflected from the surface of document 7, adjacent to platen 34(b) as document 7 moves along path 3. In addition to mirror 15 receiving reflected light, as previously explained, mirror 27 receives the light of lights 18(a) and 19(a) reflected from the surface of document 7, adjacent to platen 34(a), as document 7 moves along path 3. In this manner both the top and bottom surfaces of document 7 are scanned in one pass of document 7 along path 3. If, however, sensors 50 and 51 only detect images on one side of document 7, such as the top surface of document 7, then upon such information being communicated to logic and control means 100, logic and control means 100 activates the heretofore disclosed motor to cause diverter 12 to block path 2 and mirror 15 to be positioned to receive the reflected light from to top surface of document 7 as such top surface passes adjacent to platen 34(b) in its travel along path 3. However, if information is only detected on the bottom surface of document 7, diverter 12 is oscillated, by logic and control means 100, to divert documents 7 between path 2 and path 3 and mirror 15 is positioned to receive light reflected from platen 34. In the above manner each document 7 is appropriately simplexed scanned as it travels along either path 2 or path 3.

In the above described manner the use of separate scanning stations 13 and 14 allows both sides of document 7 to be scanned at the same or substantially the same time. This essentially doubles the through put of an ordinary duplex scanner which normally requires the document to be turned over in order to scan both sides of the document with the same scanner, even assuming any document 7 turn around time can be eliminated in the latter structure. This structure also has the advantages associated with a straight through duplex paper path that greatly reduces the problems associated with duplex paper jams and the expense associated with turn-over mechanisms and the like for duplex document scanning. In addition simplex through put is also increased to up to twice the simplex through put of ordinary simplex scanners using only one simplex scanning path. Thus, through put and reliability is greatly increased in both the simplex and duplex scanning operation.

If the operator wishes to scan an item, such as a bound book, that can not be conveyed through either path 2 or path 3, to obtain the copy, the present invention is provided with a hinged top 28 (see FIG. 2) which allows access to platen 34. Since in this mode, platen 34 moves, the book when placed upon platen 34 will also move and thereby completely exposed the page of the book to be scanned to the light of lights 18 and 19. The light reflected from the page of the book is then directed by mirror 15 through lens 16 for focused impact upon scanner 17 with the electronic signals created by the impact being handled in the same manner as the electronic signals created from individual documents 7.

In operation, an operator loads input tray 6 with documents 7, to be copied, without concern regarding whether documents 7 have information to be copied on one or both sides or if the information is face up or face down in input tray 6. After such loading, scanning apparatus 1 is placed in operation and feeder 8 moves the uppermost document 7 of tray 6 into input sheet path 9 where information detectors 50 and 51 detect the placement of information contained on document 7. Upon detecting the placement of information on document 7, the detected information is transmitted to logic and control means 100 to control the movement of diverter 12 such that it blocks document 7 access to either path 2 or path 3 of scanning apparatus 1, depending upon what side or sides of document 7 are to be scanned. Upon entrance into path 2 or 3, document 7 is either scanned at scanning station 13 or 14 or both and the reflected light from the scanning of document 7, as document 7 is advanced through scanning stations 13 and 14, is converted by sensor 17 or 17(a) into an electronic representation of the image on document 7 for transmission of said electronic representation to an image processing or storage device. When both scanning stations 13 and 14 are in operation, at substantially the same time, the image information may be derived and transmitted alternately by each respective sensor 17 or 17(a) to the imaging or memory storage device. Thus, as sensor 17(a) is deriving image information, sensor 17 may be transferring previously derived image information to an output device 101 (see FIG. 2) such as a printer or similar imaging device for imaging a receiver. In this manner, if both sensor 17 and sensor 17(a) and say printer 1 01 are executing the same job at the same time, by using a buffer, printer 1 01 can operate at twice the speed of the individual document scanning stations 13 and 14.

While the invention has been described in detail with particular reference to a preferred embodiment thereof, it should be understood that variations and modifications can be effected within the spirit and scope of the invention.

I claim:

1. A scanning apparatus for simplex and duplex document scanning, said apparatus comprising:
    a first and a second document path for transporting the documents to be scanned,
    a first scanning station positioned adjacent both document paths for scanning a first surface of documents transported along one of said document paths and a second surface of the documents transported along another document path,
    a second scanning station positioned adjacent only one of said document paths for scanning the surface, adjacent to said second scanning station, of documents traveling along said document path, and
    means for selectively directing the documents to the first and second document paths for scanning.

2. The scanning apparatus of claim 1 wherein the means for selectively directing the documents to the first and second document paths includes a movable arm, detecting means for detecting the existence of information on at least one of the surfaces of the documents to be scanned and logic and control means for moving the movable arm in response to the existence of information detected to provide document access to one of said document paths.

3. The scanning apparatus of claim 2 wherein the means for selectively directing the documents further includes a common document path for initial receipt of the document to be scanned and detecting means located on both sides of the common path.

4. The scanning apparatus of claim 2 wherein the movable arm is located prior to the first and second document paths to allow document access to only one of said paths for duplex scanning and to one or more of said paths for simplex scanning.

5. A scanning apparatus for simplex and duplex document scanning, said apparatus comprising:
    a first and a second document path for transporting the documents to be scanned,
    a first scanning station positioned adjacent both document paths for scanning documents transported along said document paths,
    said first scanning station including a first lens and first means for directing light reflected from a first surface of the documents transported along one of said document paths and from a second surface of the documents transported along the other of said document paths along a first optical path through said first lens to a first electro-optical sensor,
    a second scanning station positioned adjacent only one of said document paths for scanning a surface, adjacent to said second scanning station, of documents transported along said one document path,
    said second scanning station including a second lens and second means for directing light reflected from the surface, adjacent to said second scanning station, of document transported along said document path along a second optical path through said second lens to a second electro-optical sensor, and
    means for selectively directing the documents to the first and second document paths for scanning.

6. The scanning apparatus of claim 5 wherein the first means for directing light has a first position for directing light reflected from the surface of documents transported along one of said document paths and a second position for directing light reflected from the surface of documents transported along the other of said document paths.

7. The scanning apparatus of claim 5 wherein the first means for directing light is a movable mirror and the second means for directing light is a fixed position mirror.

8. The scanning apparatus of claim 7 wherein the first scanning station further includes at least two exposure means, separated by the movable mirror for exposing, with light, one surface of documents traveling adjacent to each exposure means such that light reflected from those surfaces incident the movable mirror along a third and a fourth optical path and reflect from the movable mirror along the first optical path.

9. Scanning apparatus for scanning simplex and duplex documents, said apparatus comprising:
   first means for feeding a document along a first path, second means for feeding a document along a second path;
   means for scanning both sides of a document fed along the first path,
   means for scanning one side of a document fed along the second path;
   means for feeding documents seriatim from a stack in a receiving means to said first and second feeding means;
   directing means adjustable between a first condition in which it directs a document from the stack into the first path and a second condition in which it directs such a document into the second path; and
   logic and control means for controlling the condition of the directing means.

10. The scanning apparatus of claim 9 including means for inputting to said logic and control means, an input indicative that a document is a duplex document, said logic and control means including means for adjusting the directing means to its first condition in response to said input.

11. The scanning apparatus of claim 10 including means for sensing that a document is a duplex document and for providing said input to said logic and control means.

12. The scanning apparatus of claim 9 including means for inputting to said logic and control means an input indicative that a document is simplex and wherein said logic and control means includes means for adjusting said directing means from its present condition to the other of its first and second conditions.

13. The scanning apparatus of claim 9 including means for inputting to said logic and control means an input indicative that a stack of documents is entirely simplex and wherein said logic and control means includes means for adjusting said directing means to alternate between its first and second conditions as said documents are fed from said stack to alternatively feed documents from said stack into the first and second paths.

14. The scanning apparatus of claim 9 including means for sensing that a document is a simplex document and for providing said input to said logic and control means.

15. The scanning apparatus of claim 9 wherein the means for scanning both sides and the means for scanning one side include a single scanning station positioned between the first and the second paths and selectively adjustable to scan a document being fed through either path.

16. A method of scanning simplex and duplex documents from a document supply, the method comprising the steps of:
   feeding the documents from the supply to one of two document scanning paths having scanning stations adjacent said paths;
   detecting the location of images contained on the surfaces of the documents;
   allowing access to only one of said document paths upon detecting images contained on one surface of said documents and to either document path upon detecting images contained on the another surface of the documents; and
   moving the documents along said path of access adjacent to and past one or more of the scanning stations.

* * * * *